US012647681B2

(12) United States Patent
Fitzpatrick et al.

(10) Patent No.: US 12,647,681 B2
(45) Date of Patent: Jun. 2, 2026

(54) SYSTEMS AND METHODS FOR APPLYING COLOUR-SPACE ADJUSTMENTS TO IMAGES

(71) Applicant: Reincubate Limited, London (GB)

(72) Inventors: Aidan Fitzpatrick, London (GB);
Hlynur Sveinbjornsson, London (GB)

(73) Assignee: Reincubate Limited (GB)

( * ) Notice: Subject to any disclaimer, the term of this patent is extended or adjusted under 35 U.S.C. 154(b) by 56 days.

(21) Appl. No.: 18/459,541

(22) Filed: Sep. 1, 2023

(65) Prior Publication Data

US 2024/0080555 A1 Mar. 7, 2024

(30) Foreign Application Priority Data

Sep. 1, 2022 (GB) ...................................... 2212757

(51) Int. Cl.
*H04N 23/67* (2023.01)
*H04N 23/63* (2023.01)

(52) U.S. Cl.
CPC ........... *H04N 23/67* (2023.01); *H04N 23/631* (2023.01)

(58) Field of Classification Search
CPC ........ H04N 23/67; H04N 23/631; H04N 9/64; H04N 9/69; H04N 23/83; H04N 23/84; G06T 7/90; G06T 7/80
See application file for complete search history.

(56) References Cited

U.S. PATENT DOCUMENTS

| | | | | |
|---|---|---|---|---|
| 11,006,088 | B1 * | 5/2021 | Pellikka | H04N 1/6033 |
| 2006/0158452 | A1 * | 7/2006 | Borger | G06T 7/80 |
| | | | | 345/582 |
| 2009/0180008 | A1 * | 7/2009 | Williams | G06T 7/80 |
| | | | | 348/241 |
| 2015/0278442 | A1 * | 10/2015 | Rezaee | G16H 30/40 |
| | | | | 382/128 |
| 2016/0259614 | A1 * | 9/2016 | Liao | H04N 9/3147 |
| 2016/0277650 | A1 * | 9/2016 | Nagaraja | G06T 7/85 |
| 2016/0373670 | A1 * | 12/2016 | Matsubara | G02B 21/365 |
| 2017/0244961 | A1 * | 8/2017 | Berfanger | H04N 17/002 |
| 2018/0365859 | A1 * | 12/2018 | Oba | B60W 40/114 |
| 2019/0304105 | A1 * | 10/2019 | Gao | G06V 10/255 |
| 2020/0089971 | A1 * | 3/2020 | Li | G01S 7/4972 |
| 2021/0297637 | A1 * | 9/2021 | Chang | H04N 25/76 |
| 2022/0358627 | A1 * | 11/2022 | Deng | G06N 3/08 |

* cited by examiner

*Primary Examiner* — Padma Haliyur
(74) *Attorney, Agent, or Firm* — Endurance Law Group PLC; James R. Yee

(57) ABSTRACT

Methods, system and devices for applying adjustments to images of a video stream are provided. An image device controller is configured to apply image adjustments to the images received from an imaging device, to map at least a portion of each of those images from one colour space to another in real-time. A calibration routine is executed that includes transmitting calibration data associated with the imaging device to an image adjustment engine. In response, the image adjustment engine processes that calibration data to determine a set of image adjustment instructions, and sends them to the controller. The controller receives the set of image adjustment instructions, and them to apply a customised mapping of colours to at least a portion of each image generated by the imaging device.

18 Claims, 3 Drawing Sheets

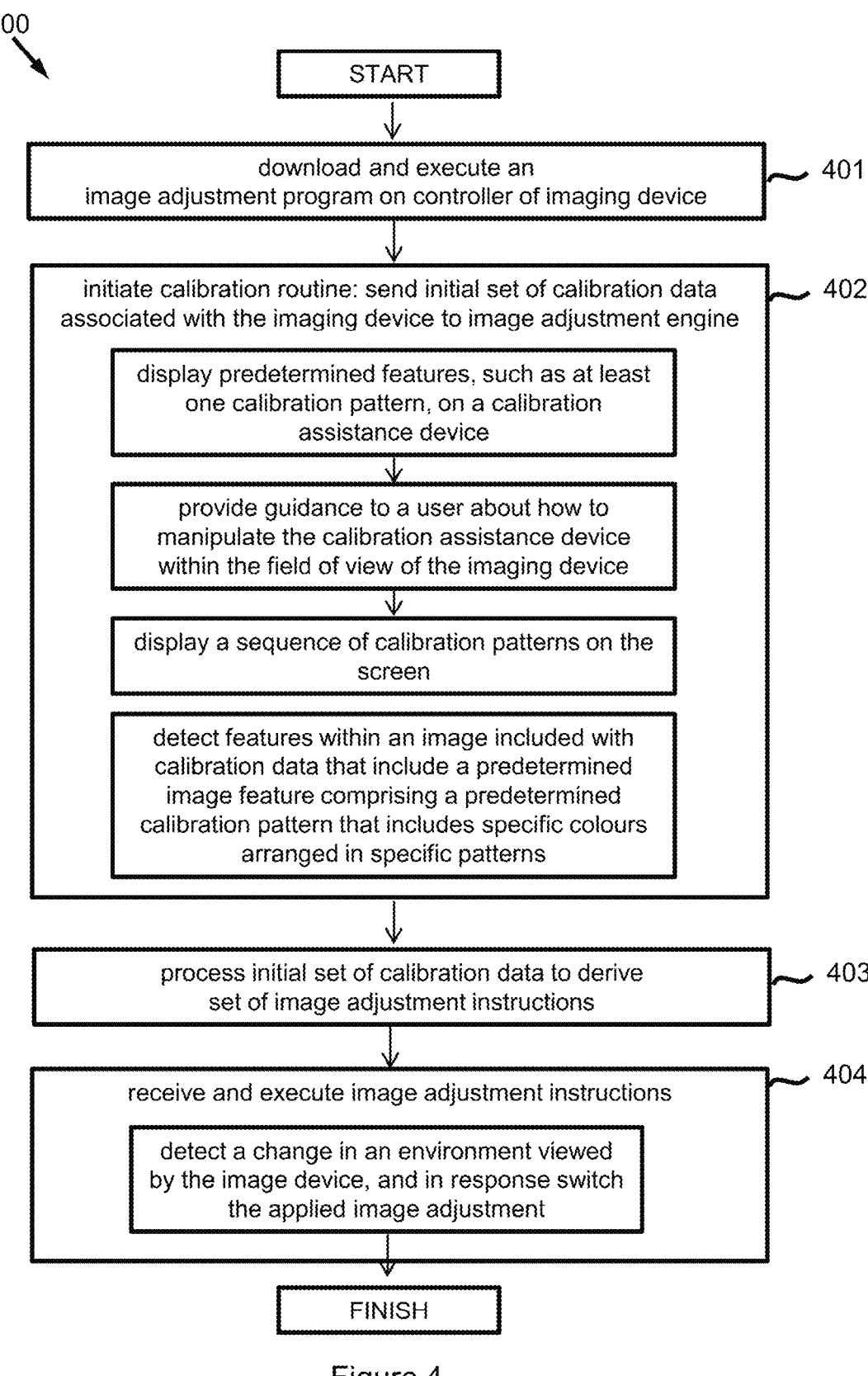

400

START download and execute an
image adjustment program on controller of imaging device                401 initiate calibration routine: send initial set of calibration data
associated with the imaging device to image adjustment engine          402 display predetermined features, such as at least
one calibration pattern, on a calibration
assistance device provide guidance to a user about how to
manipulate the calibration assistance device
within the field of view of the imaging device display a sequence of calibration patterns on the
screen detect features within an image included with
calibration data that include a predetermined
image feature comprising a predetermined
calibration pattern that includes specific colours
arranged in specific patterns process initial set of calibration data to derive
set of image adjustment instructions                                   403 receive and execute image adjustment instructions                      404 detect a change in an environment viewed
by the image device, and in response switch
the applied image adjustment

FINISH

Figure 4

SYSTEMS AND METHODS FOR APPLYING COLOUR-SPACE ADJUSTMENTS TO IMAGES

CROSS REFERENCE TO RELATED APPLICATIONS

This application claims priority to Great Britain Patent Application GB 2212757.5 filed on Sep. 1, 2022, the entire disclosure of which is hereby incorporated by reference and relied upon.

BACKGROUND OF THE INVENTION

Field of the Invention. The present invention relates to devices, systems and methods for image adjustment, in particular for enhancing video footage to be used in streaming, video conferencing and other real-time video transmission.

Description of Related Art. There is a general desire to optimise the quality of results that can be achieved with imaging devices, especially low-performance imaging devices that are used for capturing video footage. One area that is particularly relevant is the use of webcams for capturing video footage to be streamed—i.e. broadcasted to an audience in real-time. Streamers—the users of those webcams—often themselves feature in the video footage, and desire that their appearance and that of their surroundings within the footage is enhanced. However due to hardware and software limitations, sophisticated image enhancements cannot often be practically applied, especially in real-time to a live video stream.

One image enhancement that is computationally efficient and practical is the application of a colour Look Up Table (LUT) in which the images generated by the imaging device are mapped from one colour space to another. By choosing an appropriate LUT the undesirable effects of having a poor-quality imaging device and/or lighting conditions can be offset, at least in part.

However, choosing an optimal LUT can be technically challenging, and time-consuming for a user to perform manually. Choosing an optimal LUT can also be difficult to automate, even partially, due to the wide range of different make, models and types of imaging devices, and the high variability of lighting and scene conditions. Furthermore, after a LUT is chosen and applied for a particular condition, that condition may change, rendering the original LUT choice sub-optimal.

It is against this background that the present invention has been devised.

BRIEF SUMMARY OF THE INVENTION

According to a first aspect of the present invention there may be provided a system for applying image adjustments. The system may be configured to apply adjustments to images of a video stream.

The system may comprise an imaging device, such as a camera. The camera may be a webcam, or a digital SLR for example.

The system may further comprise an imaging device controller, such as a computer, communicatively connected to the imaging device to receive images from it. The imaging device and the controller may be communicatively connected to allow images to be received by the controller of an environment within the field of view (FOV) of the imaging device.

The controller may be configured to download an imaging adjustment program. The controller may execute, and so be configured by the image adjustment program. Accordingly, the controller may be configured to apply image adjustments to images, including those forming the basis of video footage, that it receives from the imaging device. Thus, in the present context, images are typically video frames. The image adjustment program may configure the controller to apply image adjustments to the images received from the imaging device. The image adjustments may comprise mapping at least a portion of each of those images from one colour space to another in real-time The application of image adjustments may include the application of a Look Up Table (LUT) to images that are generated by the imaging device to map at least a portion of those images from one colour space to another. The controller may be configured by the imaging adjustment program to load a LUT into a LUT register to allow other image or video programs to access LUT-treated images originating from the imaging device.

Additionally, the controller may be configured by the imaging adjustment program to change the applied image adjustments in response to a predetermined change detected in an image originating from the imaging device.

The controller may be configured to execute a calibration routine. The calibration routine may comprise transmitting calibration data associated with the imaging device to an image adjustment engine. The calibration data transmitted during a calibration routine may comprise at least one image captured by the imaging device. The calibration data may comprise metadata, such as an identification of the technical capabilities of the imaging device or image properties.

The controller may be configured by the imaging adjustment program to execute the calibration routine during transmission of images of the video stream, thereby detecting a predetermined change in images of the video stream originating from the imaging device, and changing the applied image adjustments in response to that predetermined change.

The predetermined change may comprise at least one change: in operating properties of the image device, such as focus, exposure and white balance; and/or resulting image properties such as brightness, tone or colour. The predetermined change may comprise at least one change in image content, such as predetermined objects appearing or disappearing from the video stream.

The image adjustment engine may process that calibration data to calculate a set of image adjustment instructions. The image adjustment engine may process that calibration data to query a database to obtain or derive a set of image adjustments instructions therefrom. The image adjustment engine may then send the set of image adjustments to the controller. Naturally, this may be a response to the controller sending the engine the calibration data.

The controller may be configured to receive and execute image adjustments instructions to apply image adjustments to images originating from the imaging device. The image adjustment instructions may be conditional on properties of the image. The image adjustment instructions may configure the controller to detect a change in an environment viewed by the image device, and in response switch the applied image adjustment.

The image adjustment engine may be configured to process the image included with the calibration data to detect features within the image, such as predetermined image features. The image adjustment engine may then be configured to determine an image standardisation transformation to be applied to the image to standardise the appearance of that image. The predetermined image feature may comprise a predetermined calibration pattern. The calibration pattern may include specific colours arranged in specific patterns.

The system may comprise a calibration assistance device. The device may be in the form of a mobile device, such as a smartphone. The device may be configured to download and execute a calibration assistance application ("app"). Thus, the calibration assistance application can thereby configure the further operation of the calibration assistance device.

One such operation may be the display of at least one calibration pattern on a screen of the calibration assistance device.

Preferably, the calibration assistance application config- ures the device to provide a user interface via the screen that provides guidance and instructions to a user about how to manipulate the device within the field of view of the imaging device. For example, the guidance may include a request that a user holds the screen of the device towards the imaging device 3.

Preferably, the calibration assistance application config- ures the calibration assistance device to display a sequence of calibration patterns on the screen. Preferably, the image adjustment program configures the controller to capture a sequence of images respectively featuring those calibration patterns.

The controller and the calibration assistance device may be configured to be coordinated with one another by enact- ing a coordination process. Preferably, the coordination process enables communication between the controller and the calibration assistance device. Advantageously, this facilitates the collection of a complete set of calibration data. Specifically, this can enable iterative collection of calibra- tion data during a calibration routine.

The iterative collection of calibration data during a cali- bration routine may comprise processing an initial set of calibration data based on initial features displayed by the calibration assistance device, and captured by the imaging device, modifying the features displayed by the calibration assistance device in dependence on the processed initial set of calibration data, and then collecting at least a further set of calibration data based on the modified features displayed by the calibration assistance device, and captured by the imaging device. To this end, the calibration assistance device may be configured by the calibration assistance application to modify the calibration pattern displayed on its screen on receipt of a modification request.

The image adjustment engine may be configured to query the database to locate image adjustment settings therein that can form the basis of suitable image adjustment instructions. The query may be constructed from the calibration data sent to the engine by the controller. The image adjustment engine may be configured to construct the query to target records in the database that relate to image adjustment settings applied or recommended for images and conditions similar to that reflected by the calibration data received from the controller.

The query may be constructed from the calibration data sent to the image adjustment engine by the image device controller, the query being constructed to target records in the database that relate to image adjustment settings recom- mended for at least one of:

> images similar to that reflected by the calibration data received from the controller;
>
> conditions of an imaged environment similar to that reflected by the calibration data received from the controller; and imaging devices similar to that with which the calibration data is associated.

Preferably, the query comprises multiple parameters. Weights may be applied to each parameter to allow a similarity search of the database to locate the most relevant results.

The image adjustment engine may comprise a fingerprint generator for receiving, as an input, calibration data sent to it by a controller, and in response generating a fingerprint from that calibration data for use in composing a query of the database. The fingerprint may be in the form of a multidimensional vector, and querying the database com- prises performing a similarity search to find the closest matching vector. Records in the database may be stored with the query or fingerprint as an index. Advantageously, this allows image adjustment settings stored alongside the index to be quickly retrieved and sent back to the image adjust- ment program at the controller. The fingerprint generator may comprise a neural network, the output of which com- prises the fingerprint.

Calibration data received by the image adjustment engine may be stored in the database as part of a record. Advanta- geously, this can be used to populate the database with information to optimally satisfy future queries received by the image adjustment engine.

The image adjustment engine may comprise at least a part of a computer-implemented convolutional neural network (CNN) that is trained as an image colour mapper. The CNN may be trained to receive at least one of:

> images from the imaging device as an input image;
>
> metadata relating to the imaging device; and
>
> metadata relating to the images generated by the imaging device;

and, in response, output at least one of:

> an improved image that includes at least a portion of an input image being mapped to another colour space; and
>
> image adjustment instructions, such as a LUT that, when applied to at least a portion of an input image, results in the improved image.

The image adjustment engine that comprises at least a part of a computer-implemented convolution neural network (CNN) may be stored and executed on the imaging device controller.

The system may comprise other components, such as a server and at least one communication network.

According to a second aspect of the present invention there is provided a method of performing an image adjust- ment operation. The method comprises at least one of the steps of:

> downloading an image adjustment program to a controller of an imaging device;
>
> executing the image adjustment program to configure the controller;
>
> initiating a calibration routine;
>
> sending at least one set of calibration data associated with the imaging device;
>
> processing the at least one set of calibration data to derive a set of image adjustment instructions;
>
> receiving the image adjustment instructions at the con- troller of the imaging device; and
>
> executing the image adjustment instructions to adjust images originating from the imaging device. Ideally, the image adjustment instructions map at least a portion of those images from one colour space to another in real-time.

According to a third aspect of the present invention there is provided a computer program comprising instructions which, when executed on at least one of a controller of an imaging device, and an image adjustment engine, configures it/them to perform an image adjustment operation. The image adjustment operation may comprise at least one step of the method according to the second aspect of the present invention.

It will be understood that features and advantages of different aspects of the present invention may be combined or substituted with one another where context allows.

For example, the features of the system described in relation to the first aspect of the present invention may be provided as part of the method described in relation to the second aspect of the present invention, and/or the computer program of the third aspect and vice-versa.

Furthermore, such features may themselves constitute further aspects of the present invention, either alone or in combination with others.

For example, the features or functions performed by the controller, the imaging device, the calibration assistance device, the calibration assistance application, the image adjustment application, the image adjustment engine may themselves constitute further aspects of the present invention.

BRIEF DESCRIPTION OF THE SEVERAL
VIEWS OF THE DRAWINGS

In order for the invention to be more readily understood, embodiments of the invention will now be described, by way of example only, with reference to the accompanying drawings in which:

FIG. 4 is a flow diagram of a general image adjustment method according to various embodiments of the present invention, the image adjustment being suitable for implementation by the image adjustment system of FIG. 1.

DETAILED DESCRIPTION OF THE
INVENTION

Figure 1:
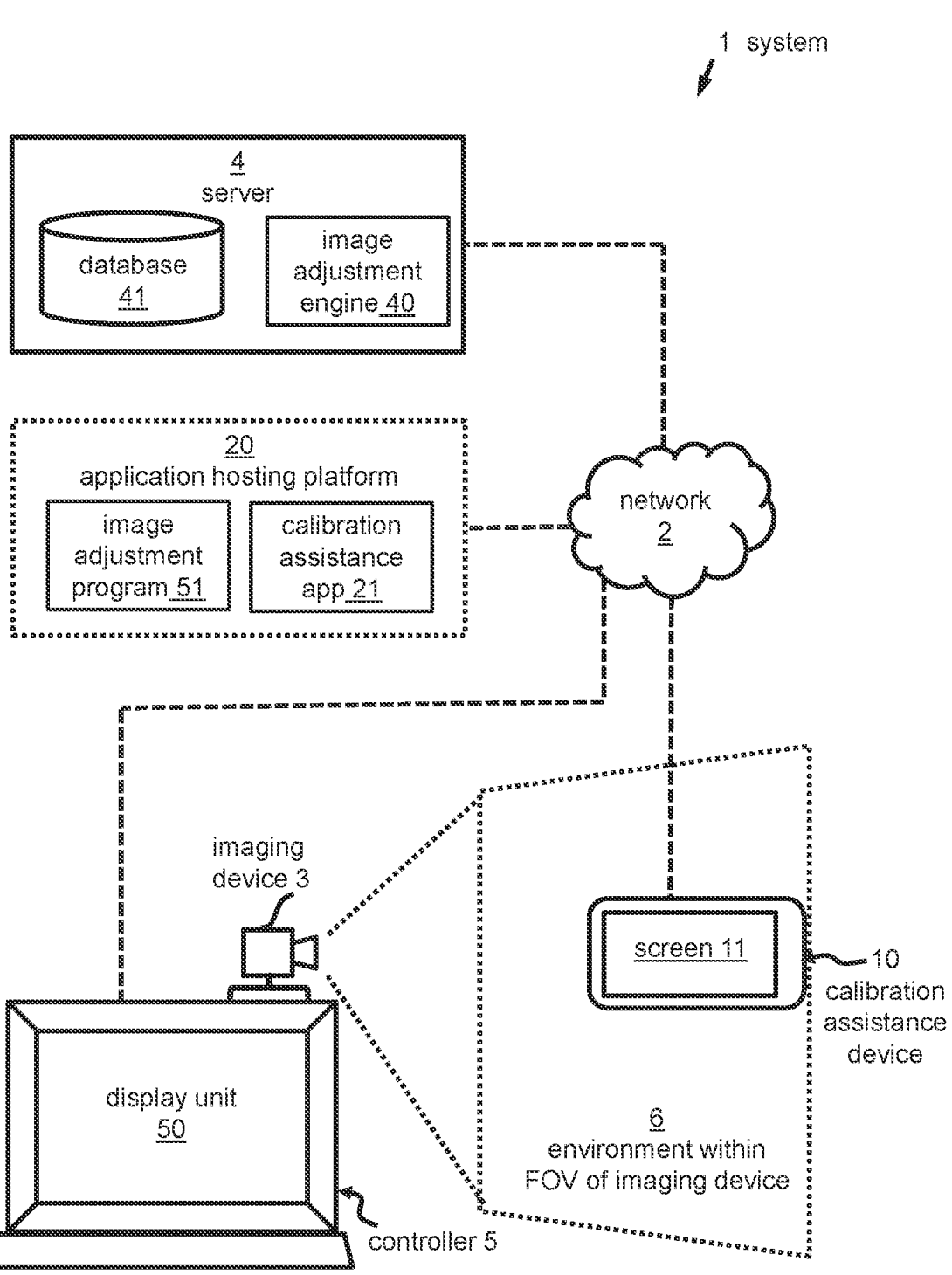
FIG. 1 shows a schematic view of an image adjustment system according to various embodiments of the present invention.

FIG. 1 shows a schematic view of an image adjustment system 1, according to a first exemplary embodiment of the present invention.

It should be noted that every component shown in and described with reference to FIG. 1 is not necessarily an essential part of embodiments of the invention—they are merely included for completeness. Notably, some of the components may be simply used by or interact with the system 1 rather than necessarily being integral parts of the system 1 itself. For example, an application hosting platform 20, shown in dotted outline in FIG. 1, is a component that interact with the system 1.

In the embodiment shown in FIG. 1, the system 1 comprises at least part of a communication network 2, a calibration assistance application ("app") 21, a calibration assistance device 10 in the form of a mobile device 10 that is configured by the app 21, an imaging device 3 in the form of a webcam 3, a server 4, an imaging adjustment program 51, and an imaging device controller 5, such as a computer 5 that is configured by the image adjustment program 51, and that is communicatively connected to the imaging device 3 to receive images from it of an environment 6 within the field of view (FOV) of the imaging device 3.

In general, the system 1 is configured to perform an image adjustment method 400, a generalised overview of which is described in FIG. 4:

FIG. 4 is a flow diagram of a general image adjustment method 400 according to various embodiments of the present invention, including the embodiment of FIG. 1.

In a first step 401, the method comprises downloading and executing an image adjustment program 51 on the controller 5. This allows the controller 5 to be configured to apply image adjustments to images, including those forming the basis of video footage, that it receives from the imaging device 3 to which it is coupled.

Particularly relevant examples of image adjustments are those relating to the adjustment of colour, and specifically colour adjustment by selecting a colour map, such as a Look Up Table (LUT) to be applied by the controller 5 to at least a portion of the images that are generated by the imaging device 3 to map those images from one colour space to another. A segmentation process may be applied to allow different LUTs to be applied to different parts of the same image, but for simplicity, a single LUT being applied to a single image is primarily discussed herein.

To achieve the selection of an appropriate image adjustment, in a second step 402, a calibration routine is initiated in which an initial set of calibration data associated with the imaging device 3 is transmitted for processing by the image adjustment engine 40. In the present embodiment, the calibration routine starts with the controller 5 as configured by the program 51 obtaining an initial set of calibration data from the imaging device 3, and then sending it, via the network 2, to the image adjustment engine 40. In the present embodiment, the image adjustment program 51 initiates the calibration routine.

The initial set of calibration data includes an image captured by imaging device 3, and metadata. The metadata may include an identification of the technical capabilities and behaviours of the imaging device. For example, the metadata may include identifiers that, for example, identify hardware information, such as the make and model of the imaging device 3, and a firmware version of the device. This information can be used to look up the technical capabilities and other properties of the imaging device 3. Metadata may also include operating properties of the imaging device 3, such as focus, exposure and white balance attributes and values.

In a third step 403, the method comprises processing the initial set of calibration data to derive a set of image adjustment instructions. Specifically, in the present embodiment, the image adjustment engine 40 processes the initial set of calibration data received via the network 2 from the controller 5, and depending on that initial set of calibration data generates a set of image adjustment instructions. These are sent by the engine 40 back via the network 2 to the image adjustment program 51. Thus, the engine 40 effectively receives the initial set of calibration data as a query, and in response to that query generates and transmits back to the image adjustment program 51 the image adjustment instructions.

In a fourth step 404, the method 400 comprises receiving and executing the image adjustment instructions to apply image adjustments to images originating from the imaging device 3. As mentioned, this can include the application of a colour map, such as a LUT specific to the image sent as part of the initial set of data, and thus implicitly specific to properties, such as lighting conditions, of the environment 6. As mentioned, a colour map, such as a LUT may be specific to a specified segment or region of an image.

Moreover, the image adjustment instructions can be conditional on properties of the image, and so can adapt to changing properties of the environment. Thus, the image adjustment instructions can, for example, include a set of colour maps or LUTs, each to be applied under alternative lighting conditions. Accordingly, executing the image adjustment instructions can include monitoring images originating from the imaging device 3 to determine whether such conditions have been met, and then applying the appropriate image adjustment instructions accordingly.

Referring back to FIG. 1, a more detailed description of the components and function of the system 1 will now be described.

The application hosting platform 20 initially hosts the app 21 which is subsequently downloaded, via the network 2, to the calibration assistance device 10 and executed on the calibration assistance device 10 so as to configure it for operation.

Similarly, the application hosting platform 20 also hosts the image adjustment program 51 which is downloaded by the controller 5 and executed by it.

The application hosting platform 20 may be in the form of a single platform, or a combination of several different platforms—such as the Apple® App Store®, the Google® Play™ Store, and/or the Microsoft® Store—but merely for simplicity they are represented as a single entity in FIG. 1.

The communications network 2 interconnects the components of the system 1, as well as the components that interact with the system 1. In various embodiments the network may be embodied by a wired and/or wireless local area network (LAN), peer-to-peer wireless connections (e.g. using at least one of Bluetooth and direct Wi-Fi), a wide area network (WAN) such as the Internet, or a combination of these.

Moreover, certain components of the system 1 shown in FIG. 1 may reside on a single device and so, in this case, the communications network 2 may include intra-device communication channels.

Leading on from this, certain components shown in FIG. 1 may be provided as part of or otherwise integrated with others. For example, the server 4 and the application hosting platform 20 may be implemented on a common dual-functionality server. Moreover, components may not necessarily be in the form of a single physical machine or device. For example, the term "server" may encompass, for example, a distributed or "cloud" computing service, engine, service or platform.

Also, for simplicity and clarity, only single exemplary instances of most components of the system 1 are shown in FIG. 1. Nonetheless, in practice, the system 1 will typically include at least thousands of imaging devices 3 and controllers 5.

Figure 2:
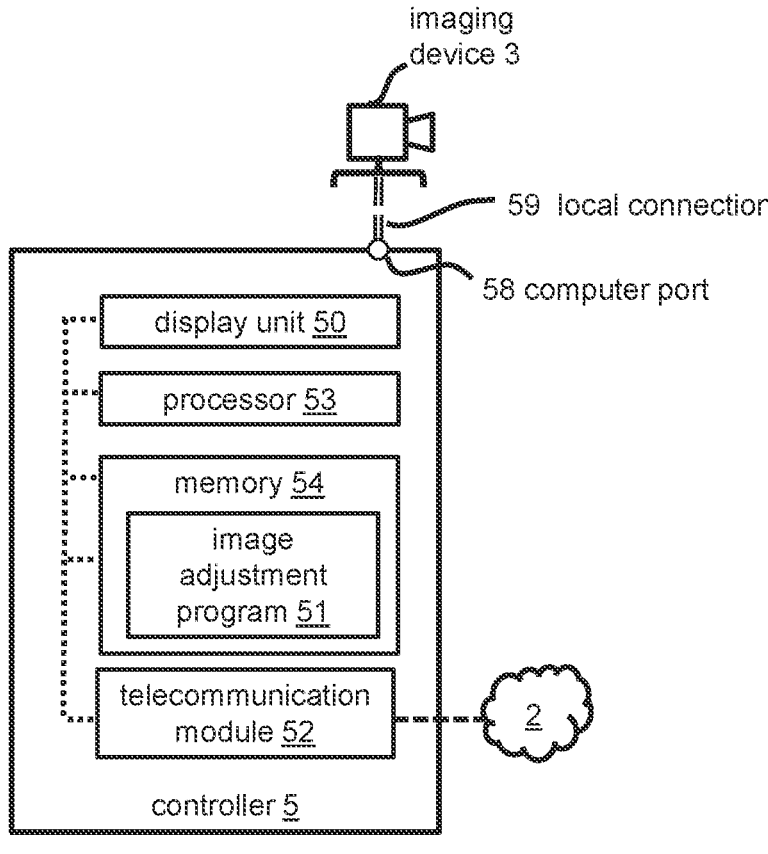
FIGS. 2 and 3 are schematic block diagrams of components of the system of FIG. 1.

Referring to FIG. 2, the controller 5 comprises a telecommunication module 52 via which it is connected to the network 2. The controller also comprises a processor 53, memory 54 and a port 58 via which a local connection 59 can be made to the imaging device 3. The image adjustment program 51 is downloaded using the telecommunication module 52, and then stored in memory 54 for execution. A display unit 50 provides a user interface via which a user can interact with the controller 5, for example directing the download of the image adjustment program 51. Images from the imaging device 3, such as those of a video feed, are also displayable on the display unit 50.

As described above, the image adjustment program 51 allows the controller 5 to be configured by image adjustment instruction received from the image adjustment engine 40 to apply at least one image adjustment. This typically involves applying a colour map such as a LUT to map the colour space originating from the imaging device 3 to another more optimal colour space. In certain adaptations, different maps may map different portions of the same image, so that colour space mapping is conditional on the spatial arrangement of colour within an image.

Moreover, and more generally, the controller 5 can be configured to apply various image adjustments automatically and dynamically—for example, during the capture of video footage as conditions of the environment 6 within the field of view of the imaging device 3 change. To this end, the image adjustment instructions configure the controller 5 to detect a change in the environment, as viewed by the image device, and in response switch the applied image adjustment.

Referring back to FIG. 1, the image adjustment instructions are received by the controller 5 from the image adjustment engine 40. In the present embodiment, this is located at the server 4. However, in alternatives, the image adjustment engine 40 may be located, at least in part, on the controller 5, optionally being embodied by the image adjustment program 51. Moreover, the image adjustment engine 40 may be distributed across both the server 4 and the controller 5 and other clients, with different parts of the engine 40 performing different functions on each component of hardware.

In the present embodiment, a database 41 is also located at the server 4, and contains image adjustment settings that can form the basis of the image adjustment instructions issued by the engine 40.

More specifically, the image adjustment engine 40 processes the image included with the initial set of calibration data set sent to it by the controller 5 during the calibration routine, the processing including detection of features within the image that can be used to inform image adjustment, such as colour correction using a LUT or another form of colour map.

To this end, the engine 40 is configured to recognise predetermined image features, and then determine an image standardisation transformation to be applied to the image included with the initial set of calibration data to standardise the appearance of that image. This can be used as the basis for generating image adjustment instructions.

For example, the engine 40 may be configured to recognise objects that have a specific range of colours. For example, a banana may be detected, and this can be used to apply colour correction.

Moreover, a predetermined image feature may comprise a predetermined calibration pattern. Such a calibration pattern may include specific colours arranged in specific patterns. Thus, if that calibration pattern is recognised within the image, it is possible to make adjustments to compensate for irregularities in the image (e.g. to lighting colour).

For example, the calibration pattern may contain a white block that is detected to have a red hue within the image that is sent as part of the calibration routine. The engine 40 is configured to process the image to determine a LUT that will restore the original white colour in that image. The LUT can then be included in the image adjustment instructions sent to the controller. In alternatives, another colour map, or colour mapping technique may be used instead of or in complement with a LUT.

Calibration patterns that are used for colour correction are often printed on to a calibration sheets. This presents the drawback that the calibration sheets must be accurately printed in order to define a predetermined colour standard against which an image can be compared for the purposes of colour correction. Furthermore, calibration sheets are passive devices, and so cannot be used effectively in a range of conditions.

To overcome this, the present embodiment utilises a calibration assistance device 10.

Figure 3:
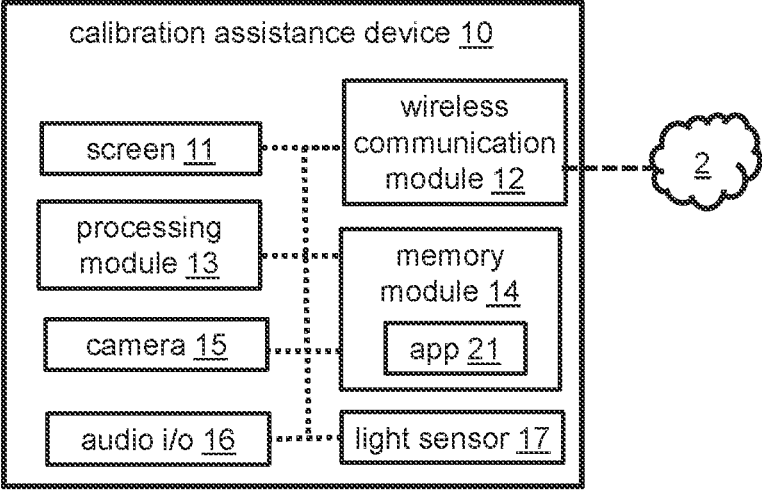

Referring to FIG. 3, the calibration assistance device 10 comprises a screen 11, a wireless communication module 12, a processing module 13, a memory module 14, a camera 15, an audio input/output interface 16, and a light sensor 17. Other components, as typically found on smartphones, may also be provided.

The calibration assistance app 21 is downloaded across the network 2 via the wireless communication module 12 and loaded into memory 14 for execution.

On execution, the app 21 configures the device 10 to provide a user interface via the screen 11 that provides guidance and instructions to a user about how to utilise the device 10. The instructions typically include a request that the user hold the screen 11 of the device 10 towards the imaging device 3. The instructions typically also include a request that a calibration routine is initiated on the controller 5.

Instructions can also be provided via a speaker of the audio input/output interface 16. Advantageously, this allow the user to receive instructions about how to manipulate the device 10 even when the screen of the device 10 is facing the imaging device 3, and so is not necessarily clearly visible to the user.

The app 21 configures the screen 11 of the device 10 to display a first calibration pattern. This is displayed to the imaging device 3, and the image adjustment program 51 on the controller 5 is configured to recognise the first calibration pattern, and select an image that contains it for inclusion in the initial set of calibration data subsequently send to the image adjustment engine 40.

Moreover, the app 21 configures the calibration assistance device 10 to display a sequence of calibration patterns on the screen 11, and the image adjustment program 51 can configure the controller 5 to capture a sequence of images respectively featuring those calibration patterns.

Additionally, the app 21 can configure the calibration assistance device 10 to function as a movable and variable colour light source of the environment 6 within the field of view of the imaging device 3. Instructions can be provided to the user to position and orient the calibration assistance device 10 within and towards different regions of the environment 6.

For example, the app 21 may issue a request that the user hold the screen 11 so it is positioned next to imaging device 3, with the screen 11 pointed towards their face, at arm's length. The app 21 can then configure the screen 11 to cycle through a set of colours. The intensity of the light that is generated by the screen 11 is also controllable by the app 21. Accordingly, the colour and intensity of the screen 11, when used as a light source of the environment, provides useful information for the purpose of subsequent calibration of the imaging device 10. This information can be used, for example, to allow a comparison between the ambient lighting conditions of the environment 6 and the actively controllable lighting provided by the calibration assistance device 10.

The dynamic, active nature of the use of a calibration assistance device 10 is clearly advantageous over passive, static printed calibration charts. The image features that can be used as a reference for calibration are richer. Furthermore, the ubiquity of smart phones mean that it is more convenient to simply configure one for use as a calibration assistance device 10 rather than obtain a printed calibration chart. Additionally, other dynamic interactions between the calibration assistance device 10 and the imaging device 3 can be exploited to determine the capabilities or operating characteristics of the imaging device 3. For example, parts of the calibration pattern may be controlled by the app 21 to change at a predetermined frequency between preset artefacts. From this, the imaging frequency and/or exposure of the imaging device 3 can be determined.

For example, the imaging device 3 may be technically capable of an imaging frequency of 60 frames per second, as determined by its make and model. The app 21 can control the screen 11 of the calibration assistance device 10 to change between preset artefacts at 60 times a second, and in response the image adjustment program 51 configures the controller 5 to capture a sequence of images featuring at least part of those preset artefacts. Depending on the presence and ordering of those preset artefacts, the exposure applied by the imaging device 3 can be determined. If all artefacts are captured in the correct order, it can be inferred that the exposure is one-sixtieth of a second, or shorter.

To further enhance the effectiveness of the calibration assistance device 10, the present embodiment allows for the operation of the controller 5 and the device 10 be coordinated with one another by enacting a coordination process.

The coordination process comprises a code exchange between the controller 5 and the calibration assistance device 10, for example outputting a code or signal at one to be received by the other. For example, the app 21 can configure the screen 11 of the device 10 to display a unique marker, such as a 2D barcode, to be captured by the imaging device 3, and then decoded by the program 51 running on the controller 5. The code exchanged encodes a communication route via which the controller 5 and the device 10 can communicate with one another via the network 2.

Moreover, both the calibration assistance device 10 and the controller 5 may be in communication with the server 4, the code exchange passing through the server 4. This can enable communication and also synchronisation of action between the server 4, the controller 5 and the device 10, which can be advantageous to the calibration routine.

Specifically, the calibration routine may comprise the image adjustment engine 40 sending commands to the app 21 of the device 10, and the program 51 of the controller 5 to increase the quality and completeness of information received by the engine 40, and so the certainty that image adjustment instructions generated by the engine 40 are optimised for the imaging device 3.

To this end, the calibration routine may comprise iteratively collecting data: An initial set of calibration data associated with the imaging device 3 is transmitted to the image adjustment engine 40. The image adjustment engine 40 processes that initial set of data, and then sends a modification request to change features within the image captured by the imaging device 3 in dependence on the outcome of processing of that initial set of data.

The request can be to the app 21 of the calibration assistance device 10 to modify the calibration pattern viewed by the imaging device. A request is also sent to the controller 5 to capture, via the imaging device 3, an image of the modified calibration pattern, and then send this subsequent set of calibration data back to the image adjustment engine 40 for further processing. Naturally, the modification request to the app 21 may also (or instead) include instructions to the user to manipulate the device 10, for example, to allow an image to be taken of the environment 6 under different lighting conditions.

Prior to sending calibration data for use in a calibration routine, the controller 5 may, in certain embodiments, pre-process that data. In particular, images in such calibration data may be pre-processed to obtain parameters from them that can assist the image adjustment engine 40 in its processing of calibration data sent to it during a calibration routine. Advantageously, this balances the computation burden of processing the image between the server 4 and the controller 5.

Nonetheless, as mentioned, the calibration data that is received during a calibration routine by the image adjustment engine 40 from the controller 5 is processed by the engine 40 to derive a set of image adjustment instructions. As discussed above, one way this can be achieved is via the recognition of predetermined features, such a calibration pattern, within the image that can be used to inform the appropriate image adjustment settings.

However, images that are received by the engine 40 may not necessarily include such predetermined features. To compensate for this, the image adjustment engine 40 is configured to query the database to locate image adjustment settings therein that can form the basis of suitable image adjustment instructions issued by the engine 40. Moreover, the query is ideally constructed from the calibration data sent to the engine 40 by the controller 5 during the calibration routine. The image adjustment engine 40 is configured to construct the query to target records in the database that relate to image adjustment settings applied or recommended for images and conditions similar to that reflected by the calibration data received from the controller 5. The query can be composed of multiple parameters including, for example, the make and model of the imaging device 3, the image capture operating properties or settings (e.g. focus, exposure, ISO), and image properties such as the colour composition of the image. Furthermore, weights may be applied to each parameter to allow a similarity search of the database 41 to locate the most relevant results. Notably, the make and model of the imaging device 3 can be used to query other similar devices within the database to obtain appropriate image adjustment instructions, especially in the event that information about that make and model of imaging device is sparse.

In certain embodiments, the image adjustment engine 40 may comprise a fingerprint generator for receiving, as an input, calibration data sent to it by a controller 5, and in response generating a fingerprint from that calibration data for use as a query of the database. The fingerprint may be in the form of a multidimensional vector, and querying the database comprises performing a similarity search to find the closest matching vector.

In either case, records in the database are stored with the query/fingerprint as an index, allowing image adjustment settings stored alongside the index to be quickly retrieved and sent back to the image adjustment program 51 at the controller 5.

Thus, the controller 5 issues calibration data during a calibration routine to the image adjustment engine 40 and receives in response from it a set of image adjustment instructions.

It should further be noted that calibration data received by the image adjustment engine 40 during a calibration routine may itself be stored in the database 41 as part of a record. If that calibration data is complete enough, for example including predetermined calibration features within the image, then this can be used to populate the database 41 with information to optimally satisfy future queries received by the image adjustment engine 40, even if the query relates to a different make or model of imaging device.

During the calibration routine, the controller 5 then receives the response from the image adjustment engine 40 and executes the image adjustment settings included in the response.

As described, this can include the application of a colour map, such as a LUT. To this end, the image adjustment program loads a LUT into a LUT register communicatively coupled to the imaging device 3 and from which other programs (e.g. streaming programs) running on the controller 5 can receive LUT-treated images originating from the imaging device 3. The LUT register is a particularly, computationally-efficient way to treat images, and so the computational burden imposed on the controller is minimised.

Nonetheless, the image adjustment program 51 can be configured by the image adjustment settings to change the applied image adjustments in response to a change in, for example, environment conditions. Thus, the image adjustment program 51 can be configured to continually monitor source images originating from the imaging device 3 to detect whether conditions demanding an alternative LUT have been met and, if so, loading the alternative LUT into the LUT register.

Additionally, the controller 5 may have multiple LUT registers, or equivalent constructs, that allow different colour space mappings to be applied to different parts of the same image.

Moreover, the controller 5 may be configured by the application to apply a segmentation process in which different portions of an image are identified so that different adjustments can be applied for each portion. For example, a foreground portion of an image featuring a user may receive an image adjustment to optimise a colour mapping optimised for the appearance of the user, whereas a background portion of the image can receive a different image adjustment comprising a different colour mapping. This is beneficial in the frequent situations where lighting is imbalanced in different parts of a scene.

Whilst embodiments have been described as using a colour map such as a LUT, typically chosen from a database, to be applied as an image adjustment that will adjust the colour of at least one portion of an image to another, other image adjustments techniques that are a part of, or implemented by the image adjustment engine can be used to replace the use of a LUT, or otherwise remove the burden of storing and sending LUTs.

One example of this is that the image adjustment engine 40 may comprise at least a part of a computer-implemented convolutional neural network (CNN).

Specifically, the CNN is trained as an image colour mapper which receives an input image, optionally accompanied by associated calibration data, and outputs either an improved image, or image adjustment instructions (e.g. including a LUT) that, when applied, results in the improved image being derived from the input image. Accordingly, the improved image may substantially comprise at least a portion of the input image that has been mapped from one colour space to another. It is typically preferable for the output of the CNN to be image adjustment instructions, as this improves the robustness of the CNN when handling various images, and also allows each controller 5 to implement the image adjustment instructions in a manner that is locally suitable for the controller 5.

In one implementation, the CNN typically comprises a succession of interconnected layers, vector outputs from earlier layers being used as inputs to later layers. The end layer of the CNN is typically an image colour mapping layer, the output of which typically includes or implements a colour map such as a LUT which, when applied to an input image, maps at least a portion of that input image from one colour space to another, thereby resulting in an improved output image.

Preferably, the CNN is trained using training sets that each include: a candidate input image of a scene, at least one associated calibration data point, such as an identification of the camera generating that candidate input image, and an ideal reference output image of the same scene, typically captured using a high-quality camera operating in optimal conditions. The ideal reference output image is used to provide feedback to the CNN about how a candidate input image should be adjusted, primarily via colour mapping, to optimise its appearance.

Ideally, multiple calibration data points are used for each candidate input image, and may include settings or operating properties of the camera, such as ISO level, focus, exposure and automatic white balance. Ideally, the same scene is used for multiple training set clusters, with variations for each calibration data point, so that the CNN can be trained to determine an appropriate optimisation for each variation in calibration data.

Accordingly, the CNN can be trained to map a less desirable image into a better one, typically via the application of image adjustment instructions.

An advantage of utilising a CNN as at least part of an image adjustment engine is that it can provide multiple colour space mapping functions that would otherwise require multiple LUTs to implement. If those LUTs need to be transferred from a server 4 to various clients, such as the controller 5, this would necessitate the transfer of large quantities of data that specify those multiple LUTs. In many cases the LUTs would occupy computer storage space many orders of magnitude larger than a CNN capable of providing equivalent colour space mapping functions, as well as other functions. Thus, one advantageous variation of the present invention involves transferring at least part of a CNN to the controller 5, thereby obviating the high bandwidth requirements of transferring LUTs from the server 4 to the controller 5.

Thus, a method according to an embodiment of the present invention comprises training a CNN to function, at least in part, as an image adjustment engine, and then transferring the image adjustment engine, including the trained CNN, to the imaging device controller for use in applying image adjustments to images received from an imaging device connected to the controller.

Accordingly, improved systems, devices and method of image adjustment are provided by the present embodiment. Although the invention has been described in conjunction with specific embodiments thereof, it is evident that many alternatives, modifications and variations will be apparent to those skilled in the art. Accordingly, it is intended to embrace all such alternatives, modifications and variations.

What is claimed is:

1. A system for applying adjustments to images of a video stream, the system comprising:
an imaging device;
an imaging device controller, communicatively connected to the imaging device to receive images of a video stream from the imaging device;
an image adjustment engine; and
an imaging adjustment program, executed by the controller, the program configuring the controller to apply image adjustments to the images received from the imaging device, the image adjustments comprising mapping at least a portion of each of those images from one colour space to another in real-time;
wherein:
the controller is configured by the program to execute a calibration routine that includes transmitting calibration data associated with the imaging device to the image adjustment engine;
in response the image adjustment engine processes that calibration data to determine a set of image adjustment instructions, and sends the set of image adjustment instructions to the controller;
the controller is configured by the program to receive the set of image adjustment instructions, and use the set of image adjustment instructions to apply a customised mapping of colours to at least a portion of each image generated by the imaging device; and,
a calibration assistance device configured to download and execute a calibration assistance application, the application configuring the calibration assistance device to display predetermined features, such as at least one calibration pattern, on a screen of the calibration assistance device, wherein the calibration assistance application configures the device to provide a user interface via the screen that provides guidance to a user about how to manipulate the device within the field of view of the imaging device; and
display a sequence of calibration patterns on the screen, wherein the image adjustment program configures the controller to capture a sequence of images each respectively featuring a calibration pattern of the sequence of calibration patterns.

2. The system of claim 1, wherein the application of image adjustments includes the application of a Look Up Table (LUT) to at least a portion of each image of the images of the video stream that are generated by the imaging device, the controller being configured by the imaging adjustment program to load a LUT into a LUT register of the controller.

3. The system of claim 1, wherein the controller is configured by the imaging adjustment program to execute the calibration routine during transmission of images of the video stream, thereby detecting a predetermined change in images of the video stream originating from the imaging device, and changing the applied image adjustments in response to that predetermined change; wherein the predetermined change comprises at least one change in:
operating properties of the image device, such as focus, exposure and white balance;
resulting image properties such as brightness, tone or colour; and
image content, such as predetermined objects appearing or disappearing from the video stream.

4. The system of claim 1, wherein the controller is configured to receive and execute image adjustments instructions to apply image adjustments to images originating from the imaging device, the image adjustment instructions being conditional on properties of the image.

5. The system of claim 1, wherein the image adjustment program configures the controller to detect a change in an environment viewed by the image device, and in response switch the applied image adjustment.

6. The system of claim 1, wherein the calibration data transmitted during a calibration routine comprises at least one of:
at least one image captured by the imaging device; and
metadata, such as an identification of the technical capabilities of the imaging device or image properties.

7. The system of claim 1, wherein the image adjustment engine is configured to process an image included with the calibration data to detect features within the image that include a predetermined image feature;

wherein the image adjustment engine is configured to determine an image standardisation transformation to be applied to the processed image to standardise the appearance of the predetermined image feature; and wherein the predetermined image feature comprises a predetermined calibration pattern that includes specific colours arranged in specific patterns.

8. The system of claim 1, wherein the controller and the calibration assistance device are configured to be coordinated with one another by enacting a coordination process;

wherein the coordination process enables communication between the controller and the calibration assistance device to facilitate the collection of a complete set of calibration data via iterative collection of calibration data during a calibration routine; and wherein the iterative collection of calibration data during a calibration routine comprises:

processing an initial set of calibration data based on initial predetermined features displayed by the calibration assistance device, and captured by the imaging device;

modifying the features displayed by the calibration assistance device in dependence on the processed initial set of calibration data; and collecting at least a further set of calibration data based on the modified features displayed by the calibration assistance device, and captured by the imaging device.

9. The system of claim 8, wherein the calibration assistance device is configured by the calibration assistance application to modify the features displayed on its screen on receipt of a modification request from the calibration assistance application.

10. The system claim 1, wherein the image adjustment engine comprises at least a part of a computer-implemented convolutional neural network (CNN) that is trained as an image colour mapper, the CNN being trained to receive at least one of:

images from the imaging device as an input image;

metadata relating to the imaging device; and metadata relating to the images generated by the imaging device;

and, in response, output at least one of:

an improved image that includes at least a portion of an input image being mapped to another colour space; and image adjustment instructions, such as a LUT that, when applied to at least a portion of an input image, results in the improved image.

11. The system of claim 10, wherein the image adjustment engine that comprises at least a part of a computer-implemented convolution neural network (CNN) is stored and executed on the imaging device controller.

12. A system for applying adjustments to images of a video stream, the system comprising an imaging device;

an imaging device controller, communicatively connected to the imaging device to receive images of a video stream from the imaging device;

an image adjustment engine;

an imaging adjustment program, executed by the controller, the program configuring the controller to apply image adjustments to the images received from the imaging device, the image adjustments comprising mapping at least a portion of each of those images from one colour space to another in real-time;

wherein:

the controller is configured by the program to execute a calibration routine that includes transmitting calibration data associated with the imaging device to the image adjustment engine;

in response the image adjustment engine processes that calibration data to determine a set of image adjustment instructions, and sends the set of image adjustment instructions to the controller;

the controller is configured by the program to receive the set of image adjustment instructions, and use the set of image adjustment instructions to apply a customised mapping of colours to at least a portion of each image generated by the imaging device; and, a database, the image adjustment engine processing the calibration data to query the database to obtain a set of image adjustments instructions therefrom, the query being constructed from the calibration data sent to the image adjustment engine by the image device controller, the query being constructed to target records in the database that relate to image adjustment settings recommended for at least one of:

images similar to that reflected by the calibration data received from the controller;

conditions of an imaged environment similar to that reflected by the calibration data received from the controller; and imaging devices similar to that with which the calibration data is associated;

and wherein the query comprises multiple parameters, weights being applied to each parameter to allow a similarity search of the database to locate the most relevant results.

13. The system of claim 12, wherein image adjustment engine comprises a fingerprint generator for receiving, as an input, calibration data sent to it by a controller, and in response generating a fingerprint from that calibration data for use in composing a query of the database.

14. The system of claim 13, wherein the fingerprint is in the form of a multidimensional vector, and querying the database comprises performing a similarity search to find the closest matching vector.

15. The system of claim 13, wherein the fingerprint generator comprises a neural network, the output of which comprises the fingerprint.

16. The system of claim 12, wherein calibration data received by the image adjustment engine is stored in the database as part of a record for use in populating the database with information to optimally satisfy future queries received by the image adjustment engine.

17. A method of performing an image adjustment operation, comprising at least one of the steps of:

downloading an image adjustment program to a controller of an imaging device;

executing the image adjustment program to configure the controller;

initiating a calibration routine;

sending at least one set of calibration data associated with the imaging device;

processing the at least one set of calibration data to derive a set of image adjustment instructions;

receiving the image adjustment instructions at the controller of the imaging device;

executing the image adjustment instructions to adjust images originating from the imaging device, the image adjustment instructions mapping at least a portion of those images from one colour space to another in real-time;

downloading and executing a calibration assistance application on a calibration assistance device, the application configuring the calibration assistance device to display predetermined features, such as at least one calibration pattern, on a screen of the calibration assistance device, wherein the calibration assistance application configures the device to provide a user interface via the screen that provides guidance to a user about how to manipulate the device within the field of view of the imaging device; and displaying a sequence of calibration patterns on the screen, wherein the image adjustment program configures the controller to capture a sequence of images each respectively featuring a calibration pattern of the sequence of calibration patterns.

18. One or more non-transitory computer-readable storage media, having a set of computer programs comprising instructions which, when executed on a controller of an imaging device, and an image adjustment engine, configures them to perform an image adjustment operation that includes the steps of:

downloading an image adjustment program to a controller of an imaging device;

executing the image adjustment program to configure the controller;

initiating a calibration routine;

sending at least one set of calibration data associated with the imaging device;

processing the at least one set of calibration data to derive a set of image adjustment instructions;

receiving the image adjustment instructions at the controller of the imaging device;

executing the image adjustment instructions to adjust images originating from the imaging device, the image adjustment instructions mapping at least a portion of those images from one colour space to another in real-time;

downloading and executing a calibration assistance application on a calibration assistance device, the application configuring the calibration assistance device to display predetermined features, such as at least one calibration pattern, on a screen of the calibration assistance device, wherein the calibration assistance application configures the device to provide a user interface via the screen that provides guidance to a user about how to manipulate the device within the field of view of the imaging device; and displaying a sequence of calibration patterns on the screen, wherein the image adjustment program configures the controller to capture a sequence of images each respectively featuring a calibration pattern of the sequence of calibration patterns.

\* \* \* \* \*